(12) United States Patent
Achenbach et al.

(10) Patent No.: US 11,407,440 B1
(45) Date of Patent: Aug. 9, 2022

(54) STEERING COLUMN ASSEMBLY WITH PROTECTIVE CLIP

(71) Applicant: Nissan North America, inc., Franklin, TN (US)

(72) Inventors: Kurt Achenbach, Rochester, MI (US); Takeshi Kawai, Kanagawa (JP); Jeffrey Mazur, New Baltimore, MI (US); Amarendra Kumar, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/187,623

(22) Filed: Feb. 26, 2021

(51) Int. Cl.
| | | |
|---|---|---|
| *B62D 1/20* | (2006.01) | |
| *B62D 1/16* | (2006.01) | |
| *F16D 3/26* | (2006.01) | |
| *F16D 3/38* | (2006.01) | |
| *F16D 3/84* | (2006.01) | |

(52) U.S. Cl.
CPC ............... *B62D 1/20* (2013.01); *B62D 1/16* (2013.01); *F16D 3/26* (2013.01); *F16D 3/38* (2013.01); *F16D 3/84* (2013.01)

(58) Field of Classification Search
CPC .... B62D 1/16; B62D 1/20; F16D 3/26; F16D 3/38; F16D 3/40; F16D 3/405; F16D 3/84
See application file for complete search history.

(56) References Cited

U.S. PATENT DOCUMENTS

| | | | | |
|---|---|---|---|---|
| 4,365,488 A | * | 12/1982 | Mochida | ................... F16D 3/38 464/134 |
| 6,443,650 B2 | * | 9/2002 | Ikeda | ........................ F16B 2/18 403/12 |
| 6,575,658 B2 | * | 6/2003 | Daniel | ...................... F16B 2/18 464/134 |
| 6,692,177 B2 | * | 2/2004 | Crudele | .................. F16B 2/241 464/134 |
| 7,488,134 B2 | * | 2/2009 | Kinme | .................... F16D 3/387 464/182 |
| 8,038,362 B2 | * | 10/2011 | Kawanabe | .............. F16D 3/387 403/14 |
| 8,328,648 B2 | | 12/2012 | Molinar et al. | |
| 9,676,407 B2 | | 6/2017 | Tebbe et al. | |
| 2006/0258468 A1 | * | 11/2006 | Sekine | ..................... B62D 1/20 464/132 |

(Continued)

FOREIGN PATENT DOCUMENTS

| | | |
|---|---|---|
| CN | 104703859 A | 6/2015 |
| CN | 108688586 A | 10/2018 |

(Continued)

*Primary Examiner* — Laura Freedman
(74) *Attorney, Agent, or Firm* — Global IP Counselors, LLP (57) ABSTRACT

A steering column assembly includes a first shaft, a second shaft, and a clip. The first shaft has a first yoke disposed at an end thereof. The second shaft has a second yoke disposed at an end thereof. The second yoke is connected to the first yoke such that rotation of the first shaft is configured to rotate the second shaft and such that the second shaft is rotatable relative to the first shaft. The clip is removably connected to one of the first shaft and the second shaft. The clip limits rotation of the second shaft relative to the first shaft prior to installation of the steering column assembly in a vehicle.

20 Claims, 7 Drawing Sheets

(56) References Cited

U.S. PATENT DOCUMENTS

| | | | |
|---|---|---|---|
| 2012/0129615 A1 | | 5/2012 | Molinar et al. |
| 2015/0151777 A1 | | 6/2015 | Tebbe et al. |
| 2018/0292044 A1 | | 10/2018 | Heidel et al. |
| 2021/0040994 A1 | * | 2/2021 | Chung .................. F16D 1/0864 |

FOREIGN PATENT DOCUMENTS

| | | | |
|---|---|---|---|
| DE | 102011119153 A1 | | 5/2012 |
| EP | 2879937 A1 | | 6/2015 |
| JP | 2019189088 A | * | 10/2019 |

* cited by examiner

STEERING COLUMN ASSEMBLY WITH PROTECTIVE CLIP

BACKGROUND

Field of the Invention

The present invention generally relates to a steering column assembly including a protective clip configured to limit rotation of a second shaft relative to a first shaft. More specifically, the present invention relates to a steering column assembly including a protective clip removably connected to one of a first shaft and a second shaft in which the protective clip limits rotation of the second shaft relative to the first shaft.

Background Information

A steering column assembly is configured to convert the rotation of a steering wheel to pivotal movement of the wheels of the vehicle. A steering column assembly is disposed between the steering wheel and a steering mechanism, such as a gearbox or a rack and pinion system, that converts the rotational movement of the steering wheel to the pivotal movement of the wheels. The steering column assembly includes a steering column and an intermediate shaft. A universal joint is disposed between the steering column and the intermediate shaft, such that, prior to installation of the steering column assembly in a vehicle, the intermediate shaft can rotate relative to the steering column. Unrestricted rotation of the intermediate shaft relative to the steering column prior to installation in the vehicle can damage the steering column assembly.

SUMMARY

A need exists for a steering column assembly in which damage due to rotation of the components of the steering column assembly is substantially prevented prior to installation in a vehicle.

In view of the state of the known technology, one aspect of the present disclosure is to provide a steering column assembly for a vehicle. The steering column assembly includes a first shaft, a second shaft, and a clip. The first shaft has a first yoke disposed at an end thereof. The second shaft has a second yoke disposed at an end thereof. The second yoke is connected to the first yoke such that rotation of the first shaft is configured to rotate the second shaft and such that the second shaft is rotatable relative to the first shaft. The clip is removably connected to one of the first shaft and the second shaft. The clip limits rotation of the second shaft relative to the first shaft prior to installation of the steering column assembly in a vehicle.

Another aspect of the present invention is to provide a steering column assembly including a first shaft, a second shaft, and a clip. The first shaft has a first yoke disposed at an end thereof. The second shaft has a second yoke disposed at an end thereof. The second yoke is connected to the first yoke such that rotation of the first shaft is configured to rotate the second shaft in a first direction and such that the second shaft is rotatable relative to the first shaft in a second direction. The second direction is different from the first direction. The clip is removably connected to the second shaft. The clip limits rotation of the second shaft relative to the first shaft prior to installation of the steering column assembly to a vehicle. The clip is configured to be connected to the second shaft prior to installation of the steering column assembly to the vehicle. The clip is configured to be removed from the second shaft upon installing the steering column assembly to the vehicle.

Also other objects, features, aspects and advantages of the disclosed steering column assembly will become apparent to those skilled in the art from the following detailed description, which, taken in conjunction with the annexed drawings, discloses exemplary embodiments of the steering column assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
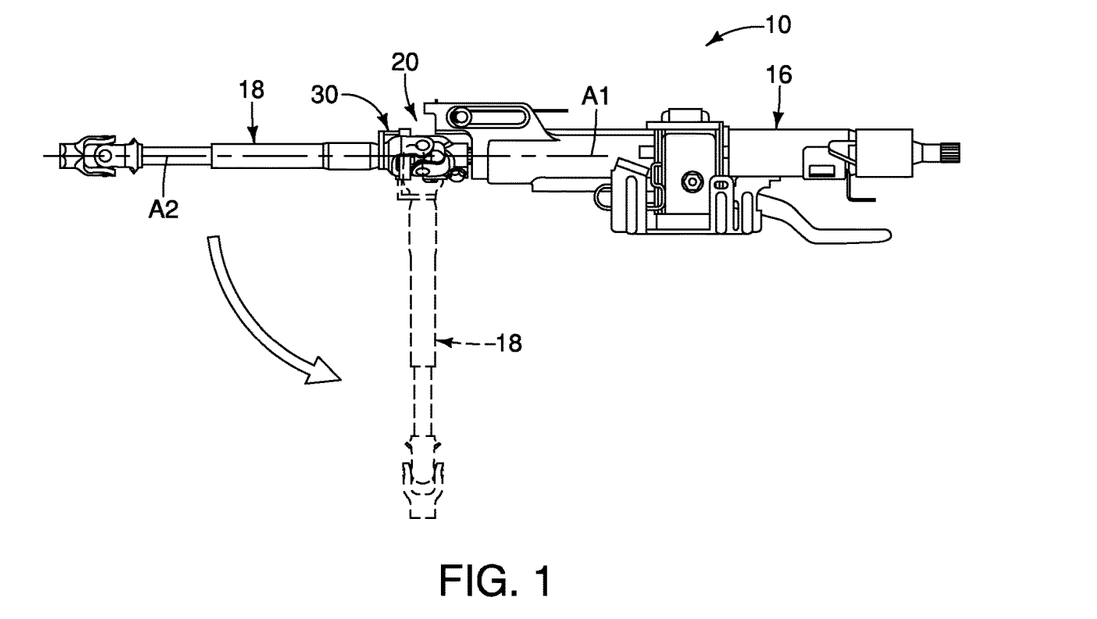
FIG. 1 is a perspective view of a steering column assembly in accordance with an exemplary embodiment of the present invention.
Figure 13:
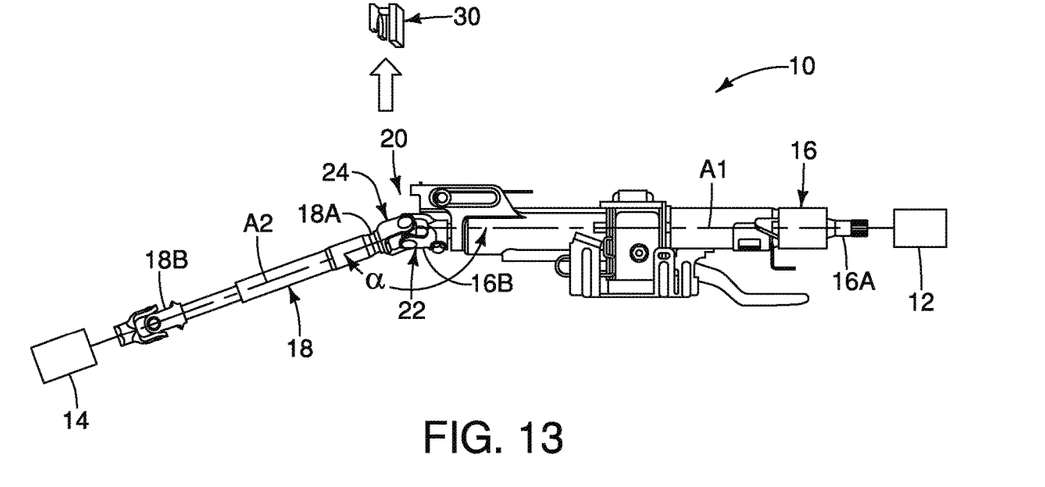
FIG. 13 is a perspective view of the steering column assembly of FIG. 1 installed in a vehicle and the protective clip removed from the steering column assembly.

Referring initially to FIGS. 1 and 13, a vehicle includes a steering column assembly 10 in accordance with an exemplary embodiment of the present invention. The steering column assembly 10 is disposed between a steering wheel 12 and a steering mechanism 14, such as a gearbox or a rack and pinion system, that converts the rotational movement of the steering wheel 12 to the pivotal movement of the wheels of the vehicle. The steering column assembly 10 includes a first shaft 16, or a steering column or upper shaft, that is connected to the steering wheel 12, and a second shaft 18, or a lower or intermediate shaft, that is connected to the steering mechanism 14. The second shaft 18 is connected to the first shaft 16 such that rotation of the first shaft 16 rotates the second shaft 18, such as when the steering wheel 12 is turned. The connection between the second shaft 18 and the first shaft 16 also allows the first and second shafts 16 and 18 to rotate relative to each other. The first shaft 16 is rotatable relative to the second shaft 18, and the second shaft 18 is rotatable relative to the first shaft 16. The connection between the first and second shafts 16 and 18 is preferably a universal joint 20, although any suitable connection can be used in which rotation of the first shaft 16 is configured to rotate the second shaft 18 and in which the first and second shafts 16 and 18 are rotatable relative to each other. As shown in FIG. 1, the second shaft 18 is rotatable relative to the first shaft 16 prior to installation of the steering column assembly 10 in the vehicle. A rotated position of the second shaft 18 is shown in dashed lines in FIG. 1.

The first shaft 16 has a first end 16A configured to be connected to the steering wheel 12 of the vehicle, as shown in FIGS. 1 and 13. A first yoke 22 is disposed at a second end 16B of the first shaft 16. The first shaft 16 is rotatable about a first longitudinal axis A1. The second end 16B of the first shaft 16 is configured to be connected to the second shaft 18.

Figure 2:
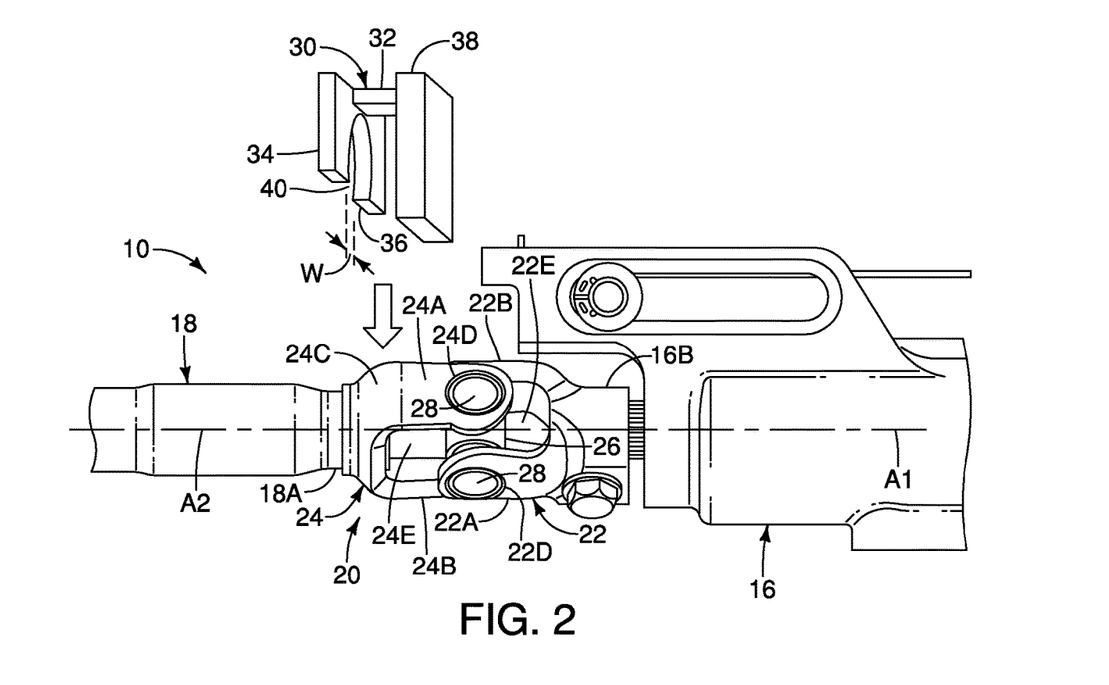
FIG. 2 is an enlarged perspective view of the steering column of FIG. 1 prior to installation of a protective clip to a second shaft.
Figure 3:
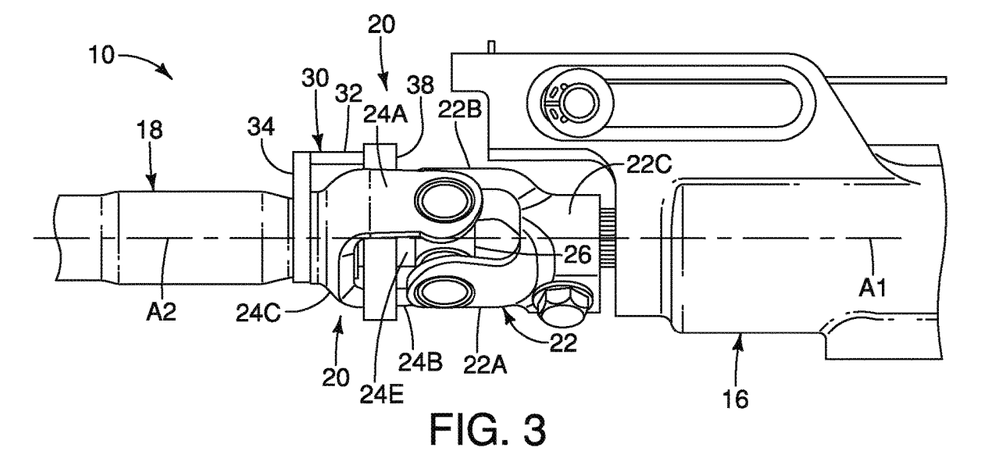
FIG. 3 is a perspective view of the steering column assembly of FIG. 2 in which the protective clip is connected to a second shaft.
Figure 5:
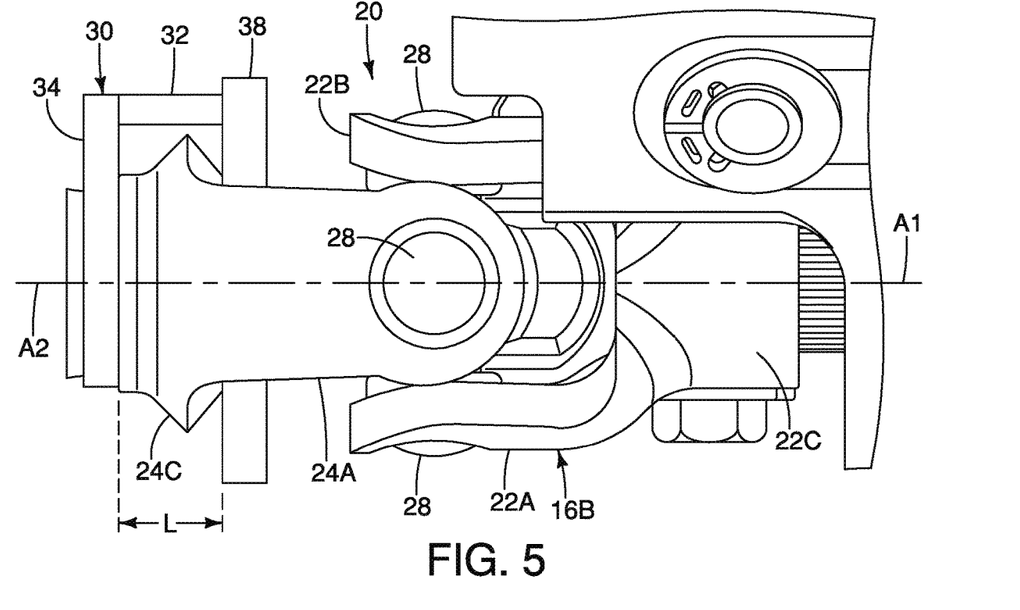
FIG. 5 is an enlarged perspective view of the steering column assembly of FIG. 3 in which the clip is connected to the second shaft.

The first yoke 22 has a first ear 22A and a second ear 22B extending outwardly from a base member 22C that form a substantially U-shaped member, as shown in FIGS. 2, 3 and 5. The first and second ears 22A and 22B extend in the same direction from the base member 22C. The first and second ears 22A and 22B extend from the base member 22C in a direction away from the first end 16A of the first shaft 16. An opening 22D is disposed in each of the first and second ears 22A and 22B of the first yoke 22. The first ear 24A and the second ear 24B are disposed on opposite sides of the first longitudinal axis A1 when viewed in a direction perpendicular to a line extending between the openings 22D in the first and second ears 22A and 22B of the first yoke 22.

The second shaft 18 has a first end 18A configured to be connected to the first shaft 16, as shown in FIGS. 1-3. A second yoke 24 is disposed at the first end 18A of the second shaft 18. A second end 18B of the second shaft 18 is configured to be connected to the steering mechanism 14, as shown in FIG. 13. The second shaft 18 is configured to be rotatable about a second longitudinal axis A2. As shown in FIG. 13, an angle α is formed between the first longitudinal axis A1 and the second longitudinal axis A2 when the steering column assembly 10 is installed in a vehicle. The second shaft 18 rotates through the angle α when rotating relative to the first shaft 16, as shown in FIGS. 5-7 and 10-12. In other words, the angle α is defined as the angle between the first and second longitudinal axes A1 and A2.

The rotation of the first shaft 16 transmitted to the second shaft 18 through the universal joint 20 is about the second longitudinal axis A2. The universal joint 20 transmits rotation of the first shaft 16 about the first longitudinal axis A1 to rotation of the second shaft 18 about the second longitudinal axis A2. The rotation of the second shaft 18 about the second longitudinal axis A2 is a first direction, and rotation of the second shaft 18 relative to the first shaft 16 is a second direction. The second direction is different from the first direction.

Figure 4:
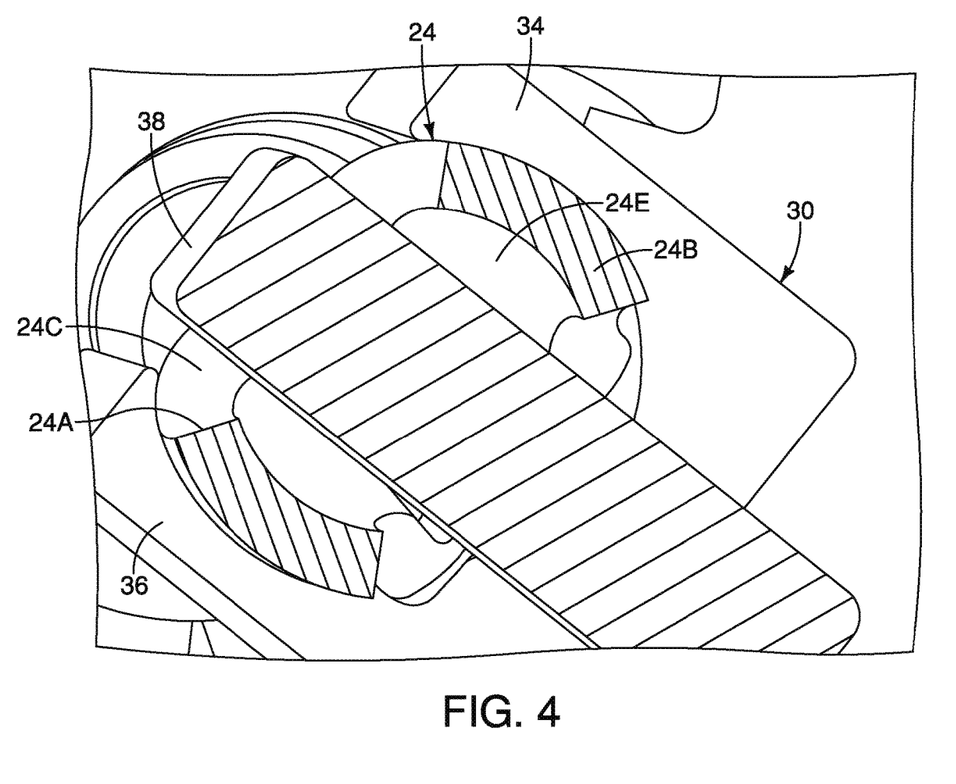
FIG. 4 is a side elevational view in cross section of the second shaft of the steering column assembly of FIG. 3.

The second yoke 24 has a first ear 24A and a second ear 24B extending outwardly from a base member 24C that form a substantially U-shaped member, as shown in FIGS. 2, 4 and 5. The first ear 24A and the second ear 24B are disposed on opposite sides of the second longitudinal axis A2. The first and second ears 24A and 24B extend in the same direction from the base member 24C. The first and second ears 24A and 24B extend from the base member 24C in a direction away from the second end 18B of the second shaft 18. An opening 24D is disposed in each of the first and second ears 24A and 24B. The first ear 24A and the second ear 24B are disposed on opposite sides of the second longitudinal axis A2 when viewed in a direction perpendicular to a line extending between the openings 24D in the first and second ears 24A and 24B of the second yoke 24.

The universal joint 20 between the first shaft 16 and the second shaft 18 transmits rotation of the first shaft 16 about the first longitudinal axis A1 to rotation of the second shaft 18 about the second longitudinal axis A2. The universal joint 20 also allows rotational movement of the first and second shafts 16 and 18 relative to each other in which the angle α between the first and second longitudinal axes A1 and A2 changes.

The universal joint 20 includes a body member 26 having four arms extending outwardly therefrom to form a substantially cross-shaped member. Each of the four arms of the body member 26 is connected to one of the ears 22A, 22B, 24A and 24B of the first and second yokes 22 and 24. The opening 22D and 24D formed in each of the ears 22A, 22B, 24A and 24B of the first and second yokes 22 and 24 receives one of the arms of the body member 26 of the universal joint. The arm of the body member 26 includes a bearing member disposed in each of the openings 22D and 24D to allow each of the first and second yokes 22 and 24 to rotate relative to each other and relative to the body member 26 of the universal joint 20.

As shown in FIG. 2, the first ear 22A of the first yoke 22 has an opening 22D that receives a bearing member. A bearing cap 28 is received in the opening 22D to cover the bearing member and seal the opening 22D. The first ear 24A of the second yoke 24 has an opening 24D that receives a bearing member. A bearing cap 28 is received in the opening 24D to cover the bearing member and seal the opening 24D. The second ears 22B and 24B of the first and second yokes 22 and 24 are similarly configured. The ears 22A, 22B, 24A and 24B of each of the first and second yokes 22 and 24 are offset by approximately 90 degrees when viewing in the direction of the longitudinal axes A1 and A2.

A protective clip, or clip, 30 is configured to be removably connected to one of the first shaft 16 and the second shaft 18, as shown in FIGS. 1, 2 and 13. The protective clip 30 limits rotation of the second shaft 18 relative to the first shaft 16 prior to installation of the steering column assembly 10 in the vehicle. As shown in FIGS. 2-7, the clip 30 is configured to be connected to the second shaft 18 prior to installation of the steering column assembly 10 to the vehicle. As shown in FIG. 13, the clip 30 is configured to be removed from the second shaft 18 after installing the steering column assembly 10 to the vehicle. As shown in FIGS. 10-13, the clip 30 is configured to be connected to the first shaft 16 prior to installation of the steering column assembly 10 to the vehicle. As shown in FIG. 13, the clip 30 is configured to be removed from the first shaft 16 after installing the steering column assembly 10 to the vehicle. The clip 30 limits the rotation angle α of the second shaft 18 relative to the first shaft 16 to approximately 90 degrees, as shown in FIGS. 1, 7 and 12, when the clip 30 is connected to either the first shaft 16 or the second shaft 18. The clip 30 is preferably integrally formed as a one-piece member. Preferably, the clip 30 is made of plastic.

The clip 30 includes a base member 32, as shown in FIG. 2. A first arm 34 and a second arm 36 extend outwardly from the base member 32. A tab 38 extends outwardly from the base member 32. The tab 38 is spaced from the first and second arms 34 and 36 in an axial direction of one of the longitudinal axes A1 and A2 of the first and second shafts 16 and 18. As shown in FIG. 5, the tab 38 is spaced a length L from the first and second arms 34 and 36 in a direction of the second longitudinal axis A2. The first and second arms 34 and 36 are spaced from one another by a width W in a direction substantially perpendicular to one of the longitudinal axes A1 and A2, as shown in FIG. 2. An opening 40 is defined between the first and second arms 34 and 36. The opening 40 is configured to receive one of the first and second shafts 16 and 18 when the clip 30 is connected thereto. Inward facing faces of each of the first and second arms 34 and 36 are rounded to facilitate receiving one of the first and second shafts 16 and 18 therebetween. The clip 30 is configured to be connected to one of the first shaft 16 and the second shaft 18. As shown in FIGS. 1, 3 and 5-7, the clip 30 is connected to the second shaft 18. As shown in FIGS. 9-12, the clip 30 is connected to the first shaft 16.

As shown in FIG. 2, a first receiving area 22E is defined between the body member 26 and the first and second arms 22A and 22B of the first yoke 22. A second receiving area 24E is defined between the body member 26 and the first and second arms 24A and 24B of the second yoke 24. The first and second receiving areas 22E and 24E are disposed on opposite sides of the body member 26 in a direction of the longitudinal axes A1 and A2.

As shown in FIGS. 3-7, the tab 38 of the clip 30 is received in the second receiving area 24E of the second yoke 24 when the clip 30 is connected to the second shaft 18. The first and second arms 34 and 36 of the clip 30 engage a shaft portion of the second shaft 18. The first and second arms 34 and 36 of the clip 30 flex to facilitate engaging the first and second arms 34 and 36 with the second shaft 18. The width W between the first and second arms 34 and 36 of the clip 30 at an uppermost edge is preferably less than a diameter of the second shaft 18 to facilitate securing the clip 30 to the second shaft 18.

Figure 6:
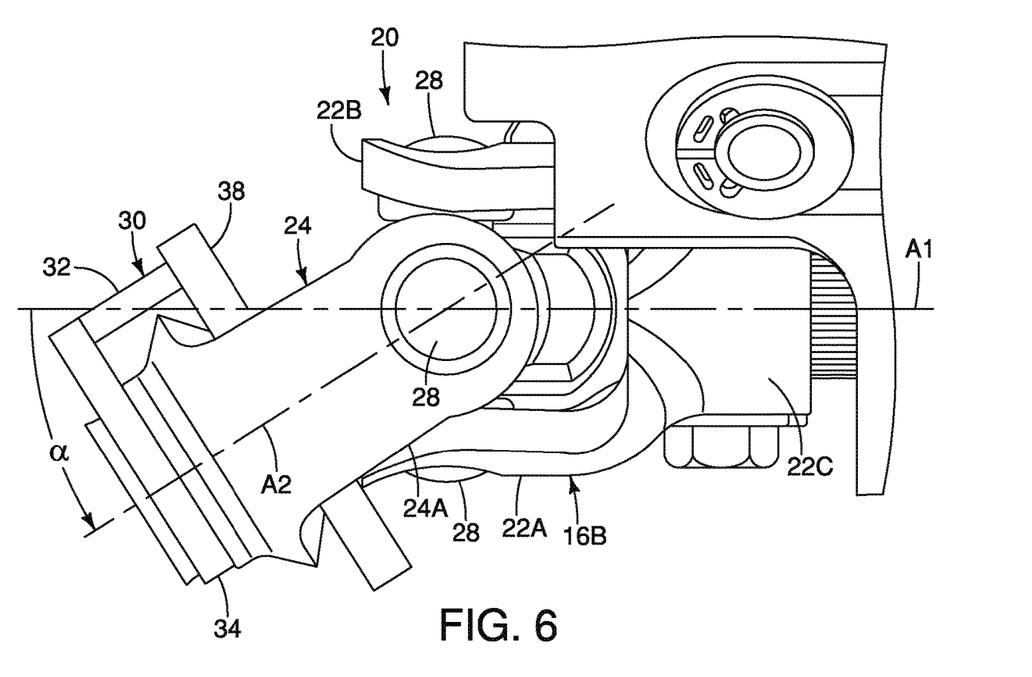
FIG. 6 is a perspective view of the steering column assembly of FIG. 5 in which the second shaft is rotated relative to the first shaft.
Figure 7:
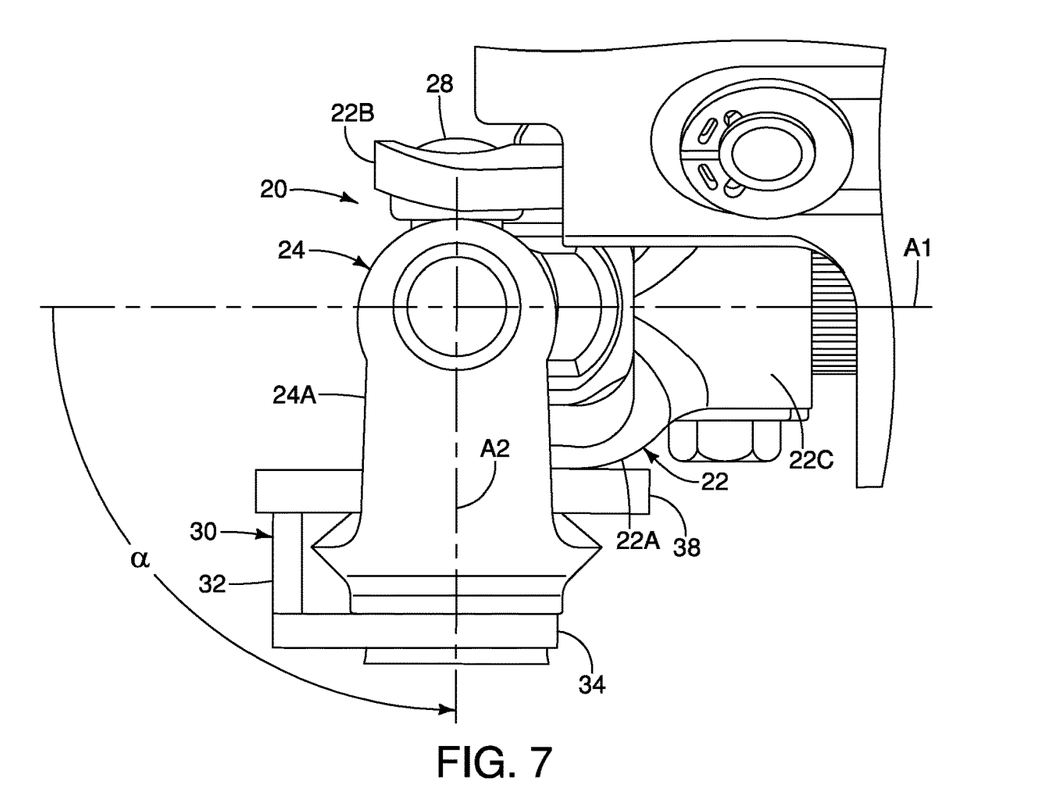
FIG. 7 is a perspective view of the steering column assembly of FIG. 6 in which the protective clip substantially prevents further rotation of the second shaft relative to the first shaft.
Figure 8:
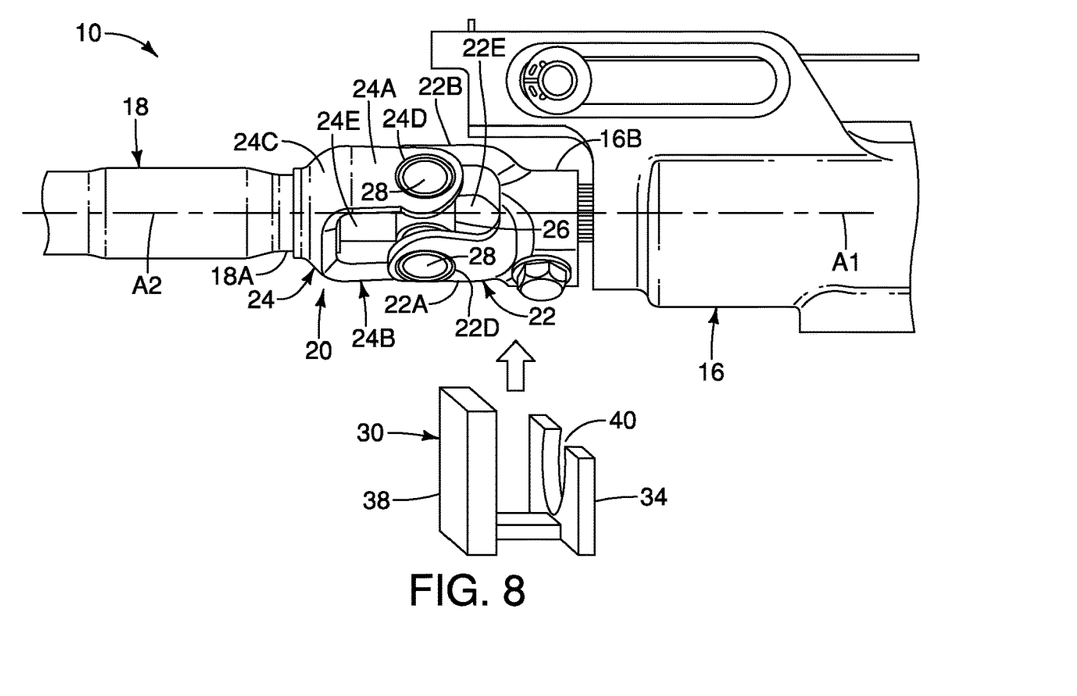
FIG. 8 is a perspective view of a steering column assembly of FIG. 1 prior to connection of a protective clip to a first shaft.
Figure 9:
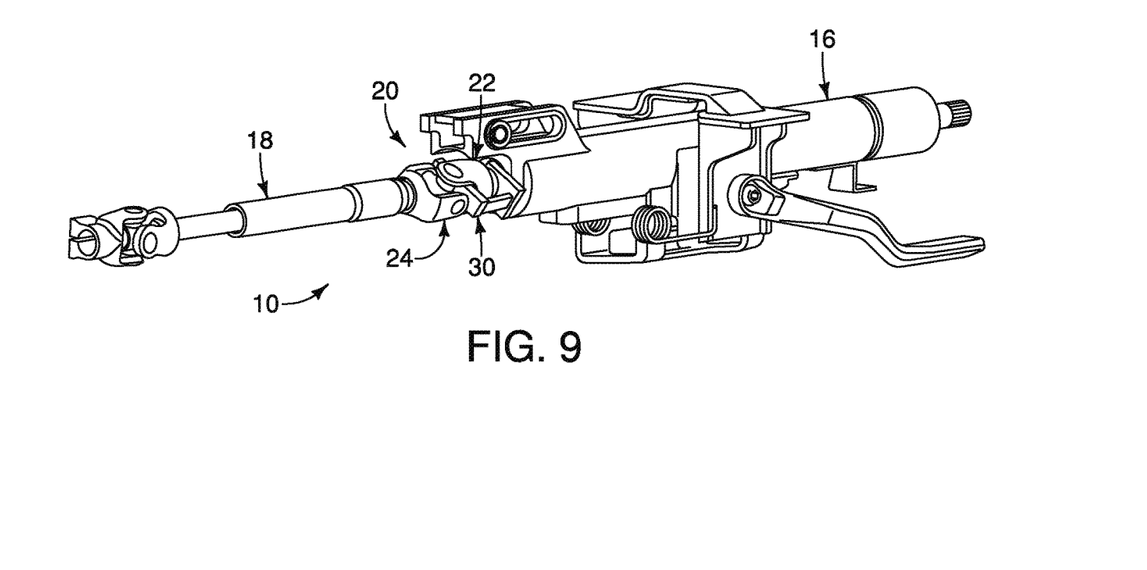
FIG. 9 is a perspective view of the steering column assembly of FIG. 8 in which the protective clip is connected to the first shaft.

As shown in FIG. 6, the second shaft 18 is rotatable through the angle α relative to the first shaft 16 with the clip 30 connected to the second shaft 18. As shown in FIG. 7, the clip 30 limits the rotation of the second shaft 18 relative to the first shaft 16 to approximately 90 degrees. The clip 30 contacts the first yoke 22 to substantially prevent further rotation of the second shaft 18 relative to the first shaft 16. The tab 38 of the clip 30 contacts the first ear 22A of the first yoke 22 to substantially prevent further rotation of the second shaft 18 relative to the first shaft 16.

Figure 10:
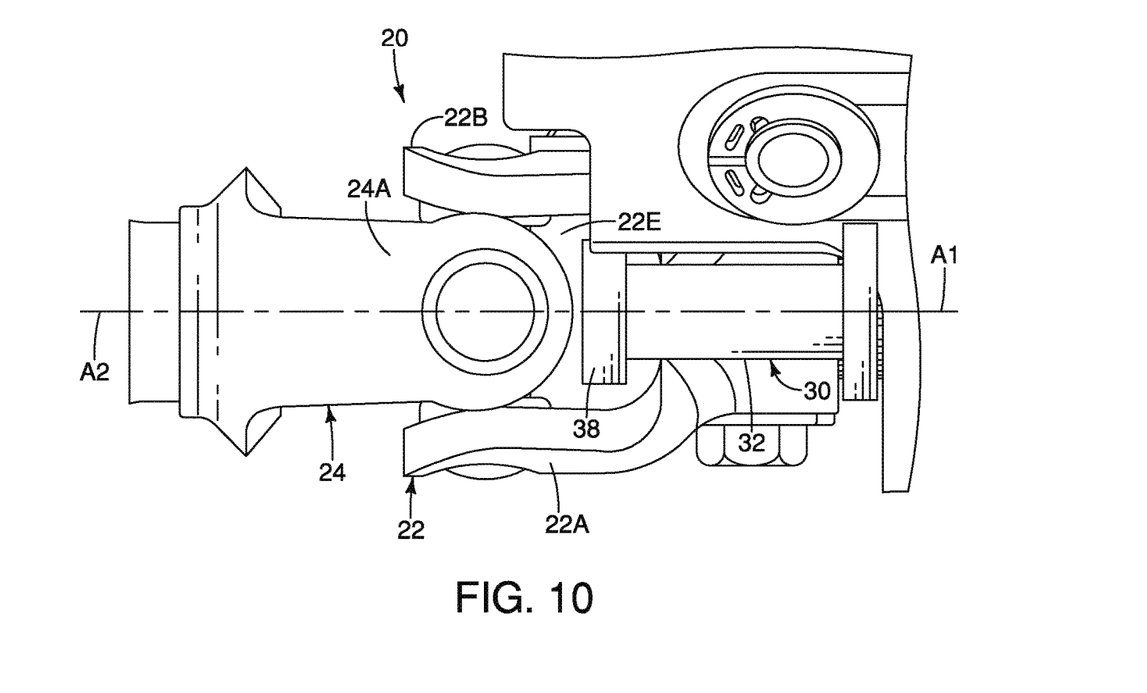
FIG. 10 is an enlarged perspective view of the steering column assembly of FIG. 9 in which the protective clip is connected to the first shaft.

As shown in FIG. 10, the tab 38 of the clip 30 is received between the first and second arms 22A and 22B of the first yoke 24 when the clip 30 is connected to the first shaft 18. The first and second arms 34 and 36 of the clip 30 engage a shaft portion of the first shaft 18. The first and second arms 34 and 36 of the clip 30 flex to facilitate engaging the first and second arms 34 and 36 with the first shaft 16. The width W between the first and second arms 34 and 36 at an uppermost edge is preferably less than a diameter of the first shaft 16 to facilitate securing the clip 30 to the first shaft 16.

Figure 11:
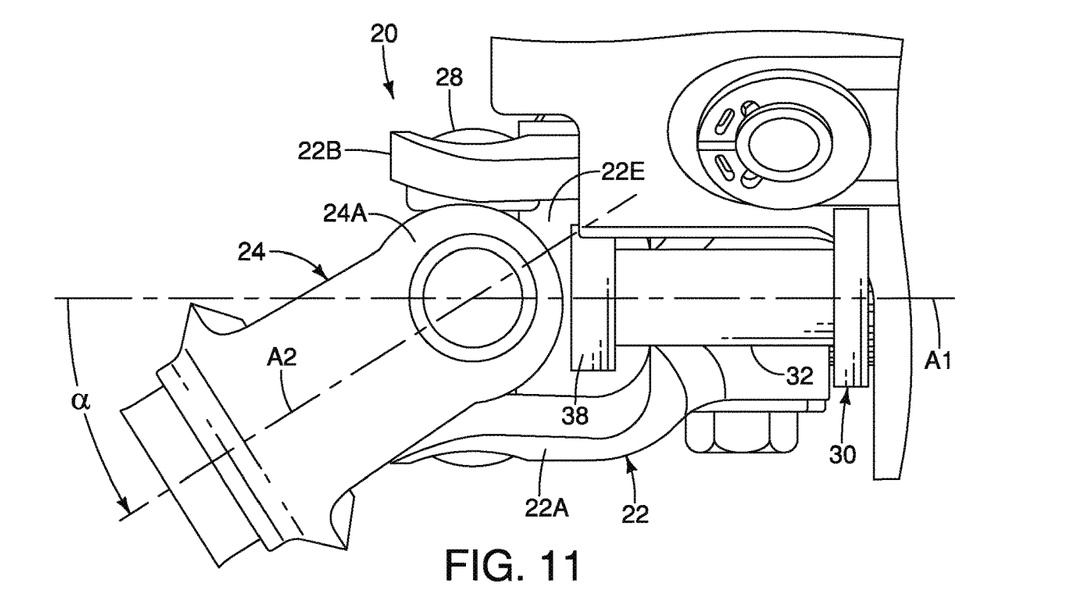
FIG. 11 is a perspective view of the steering column assembly of FIG. 10 in which the second shaft is rotated relative to the first shaft.
Figure 12:
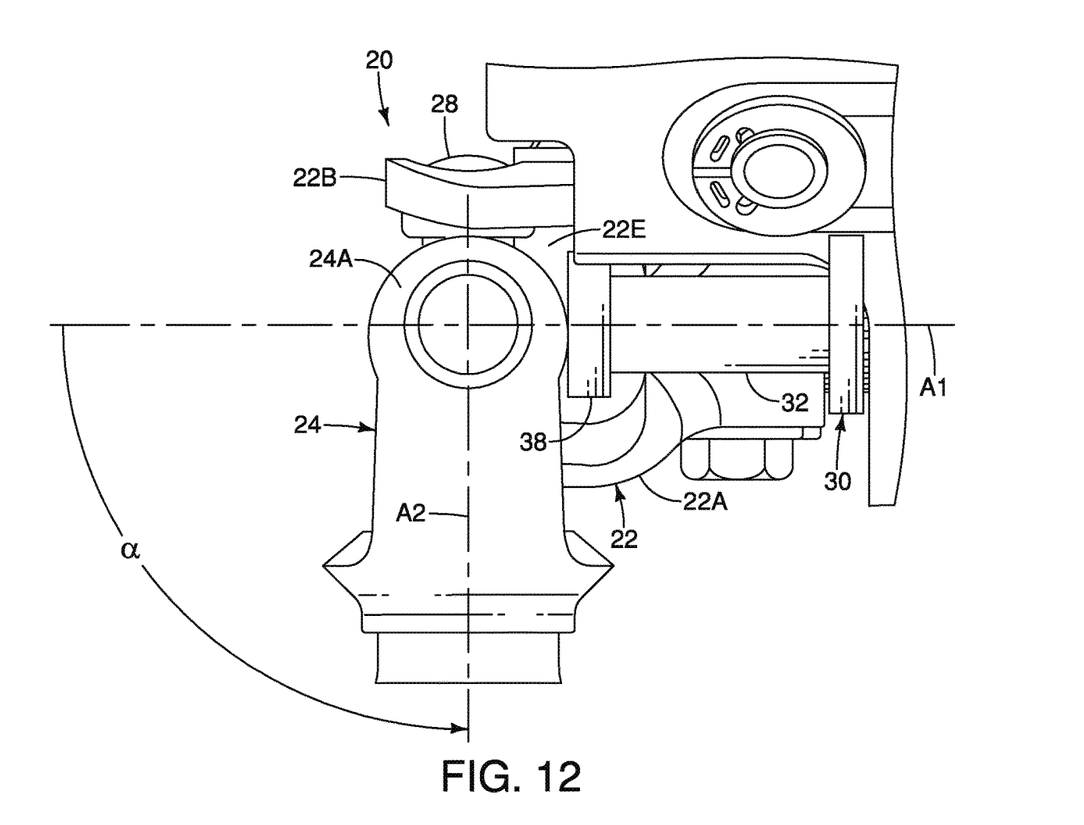
FIG. 12 is a perspective view of the steering column assembly of FIG. 11 in which the protective clip substantially prevents further rotation of the second shaft relative to the first shaft.

As shown in FIG. 11, the second shaft 18 is rotatable through the angle α relative to the first shaft 16 with the clip 30 connected to the first shaft 16. As shown in FIG. 12, the clip 30 limits the rotation of the second shaft 18 relative to the first shaft 16 to approximately 90 degrees. The clip 30 contacts the second yoke 24 to substantially prevent further rotation of the second shaft 18 relative to the first shaft 16. The first and second ears 24A and 24B of the second yoke 24 contact the tab 38 of the clip 30 to substantially prevent further rotation of the second shaft 18 relative to the first shaft 16.

The steering column assembly 10 in accordance with exemplary embodiments of the present invention substantially prevents damage thereto prior to installation in the vehicle. Prior to installation, the protective clip 30 substantially prevents over-articulation of the universal joint 20 between the first shaft 16 and the second shaft 18, such as during stowage prior to installation and during installation in the vehicle, thereby substantially preventing damage to the steering column assembly 10. Following installation of the first shaft 16 to the steering wheel 12 and the second shaft 18 to the steering mechanism 14, the protective clip 30 is removed from the universal joint 20 between the first and second shafts 16 and 18, as shown in FIG. 13.

Figure 14:
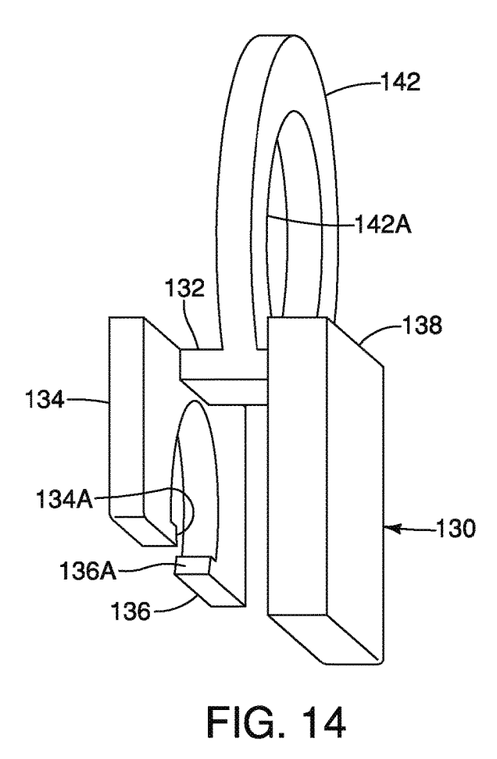
FIG. 14 is a perspective view of a protective clip of FIG. 2 including a pull tab to facilitate insertion and removal of the clip.

As shown in FIG. 14, a protective clip 130 in accordance with another illustrated exemplary embodiment of the present invention is substantially similar to the protective clip 30 of the exemplary embodiment illustrated in FIGS. 1 to 13 except for the differences described below. Similar parts are identified with similar reference numerals, except increased by 100 (i.e., 1xx, accordingly).

The clip 130 is substantially similar to the clip 30 except that the clip 130 includes a pull tab 142 extending outwardly from the base member 132 of the clip 130 to facilitate insertion and removal of the clip 130 from one of the first and second shafts. The pull tab 142 has an opening 142A to facilitate handling the clip 130. The clip 130 extends in a direction from the base member 132 opposite to the directions in which the first and second arms 134 and 136 and the tab 138 extend from the base member 132. The pull tab 142 can be disposed at any suitable position of the base member 132, such as between the first and second arms 134 and 136 and the tab 138, as shown in FIG. 14.

The clip 130 further includes projections 134A and 134B extending inwardly from inner surfaces of the first and second arms 134 and 136 of the clip 130 to substantially prevent accidental removal of the clip 130 from the first and second shaft after being connected thereto. The projections 134A and 134B decrease the width between the first and second arms 134 and 136 of the clip 130 to further secure the clip 130 to one of the first and second shafts. The projections 134A and 134B can be in addition to the pull tab 142 or in lieu thereof.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a steering column assembly. Accordingly, these terms, as utilized to describe the present invention should be interpreted relative to the steering column assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A steering column assembly comprising:
   a first shaft having a first yoke disposed at an end thereof;
   a second shaft having a second yoke disposed at an end thereof, the second yoke being connected to the first yoke such that rotation of the first shaft is configured to rotate the second shaft and such that the second shaft is rotatable relative to the first shaft; and
   a clip removably connected to one of the first shaft and the second shaft, the clip limiting rotation of the second shaft relative to the first shaft prior to installation of the steering column assembly in a vehicle.

2. The steering column assembly according to claim 1, wherein
   the clip limits rotation of the second shaft relative to the first shaft to approximately 90 degrees.

3. The steering column assembly according to claim 1, wherein
   the clip includes a base member, and first and second arms extending outwardly from the base member.

4. The steering column assembly according to claim 3, wherein
   a tab extends outwardly from the base member.

5. The steering column assembly according to claim 4, wherein
   the tab is spaced from the first and second arms in an axial direction of the one of the first and second shafts.

6. The steering column assembly according to claim 5, wherein
   the tab is received between first and second arms of the first yoke, and the first and second arms of the clip engage a shaft portion of the first shaft.

7. The steering column assembly according to claim 6, wherein
   the clip contacts the second yoke to prevent further rotation of the second shaft relative to the first shaft.

8. The steering column assembly according to claim 6, wherein
   a projection extends from inner surfaces of each of the first and second arms of the clip to substantially prevent accidental removal of the clip from the one of the first and second shafts.

9. The steering column assembly according to claim 8, wherein
   the clip is configured to be connected to the one of the first and second shafts prior to installation of the steering column assembly to the vehicle, and the clip is configured to be removed from the one of the first and second shafts upon installing the steering column assembly to the vehicle.

10. The steering column assembly according to claim 5, wherein
    the tab is received between first and second arms of the second yoke, and the first and second arms of the clip engage a shaft portion of the second shaft.

11. The steering column assembly according to claim 10, wherein
    the clip contacts the first yoke to prevent further rotation of the second shaft relative to the first shaft.

12. The steering column assembly according to claim 10, wherein
    a projection extends from inner surfaces of each of the first and second arms of the clip to substantially prevent accidental removal of the clip from the one of the first and second shafts.

13. The steering column assembly according to claim 1, wherein
    a pull tab extends outwardly from the base member of the clip to facilitate insertion and removal of the clip from the one of the first and second shafts.

14. The steering column assembly according to claim 1, wherein
    the clip is made of plastic.

15. A steering column assembly comprising:
    a first shaft having a first yoke disposed at an end thereof;
    a second shaft having a second yoke disposed at an end thereof, the second yoke being connected to the first yoke such that rotation of the first shaft is configured to rotate the second shaft in a first direction and such that the second shaft is rotatable relative to the first shaft in a second direction, the second direction being different from the first direction; and
    a clip removably connected to the second shaft, the clip limiting rotation of the second shaft relative to the first shaft prior to installation of the steering column assembly to a vehicle,
    the clip being configured to be connected to the second shaft prior to installation of the steering column assembly to the vehicle, and the clip being configured to be removed from the second shaft upon installing the steering column assembly to the vehicle.

16. The steering column assembly according to claim 15, wherein the clip limits rotation of the second shaft relative to the first shaft in the second direction to approximately 90 degrees.

17. The steering column assembly according to claim 16, wherein the clip includes
a base member;
first and second arms extending outwardly from the base member; and
a tab extending outwardly from the base member, the tab being spaced from the first and second arms in an axial direction of the second shaft.

18. The steering column assembly according to claim 17, wherein the tab is received between first and second arms of the second yoke, and the first and second arms of the clip engage a shaft portion of the second shaft.

19. The steering column assembly according to claim 18, wherein the clip contacts the first yoke to prevent further rotation of the second shaft relative to the first shaft in the second direction.

20. The steering column assembly according to claim 19, wherein a pull tab extends outwardly from the base member of the clip to facilitate insertion and removal of the clip from the second shaft.

\* \* \* \* \*